United States Patent
Thattari Kandiyil et al.

(10) Patent No.: US 10,024,956 B2
(45) Date of Patent: Jul. 17, 2018

(54) ULTRASOUND PROBE DIAGNOSING SYSTEM AND METHOD FOR DIAGNOSING ULTRASOUND PROBE

(71) Applicant: General Electric Company, Schenectady, NY (US)

(72) Inventors: Jithin Thattari Kandiyil, Vatakara Calicut (IN); Nityananda Maiya, Bangalore (IN)

(73) Assignee: General Electric Company, Schenectady, NY (US)

( * ) Notice: Subject to any disclaimer, the term of this patent is extended or adjusted under 35 U.S.C. 154(b) by 743 days.

(21) Appl. No.: 14/177,938

(22) Filed: Feb. 11, 2014

(65) Prior Publication Data

US 2014/0241115 A1    Aug. 28, 2014

(30) Foreign Application Priority Data

Feb. 28, 2013  (IN) .............................. 889/CHE/2013

(51) Int. Cl.
*G01S 7/00*   (2006.01)
*G01S 7/52*   (2006.01)

(52) U.S. Cl.
CPC ................ *G01S 7/52004* (2013.01)

(58) Field of Classification Search
USPC ........................................................ 367/13
See application file for complete search history.

(56) References Cited

U.S. PATENT DOCUMENTS

| | | | |
|---|---|---|---|
| 5,517,994 A | 5/1996 | Burke | |
| 5,689,443 A * | 11/1997 | Ramanathan | A61B 8/00 600/437 |
| 6,543,272 B1 | 4/2003 | Shuki | |
| 7,481,577 B2 | 1/2009 | Bhaskar | |
| 7,690,261 B2 * | 4/2010 | Tanaka | G01S 7/5205 600/437 |
| 2004/0133104 A1 * | 7/2004 | Cohen-Bacrie | G01S 7/52026 600/437 |
| 2005/0251035 A1 * | 11/2005 | Wong | A61B 8/00 600/437 |
| 2007/0081576 A1 | 4/2007 | Bhaskar | |
| 2007/0220980 A1 * | 9/2007 | Tanaka | G01S 7/5205 73/649 |
| 2008/0234585 A1 * | 9/2008 | Iwama | G01S 15/8925 600/447 |

(Continued)

FOREIGN PATENT DOCUMENTS

EP    1629779 B1    1/2008

*Primary Examiner* — James R Hulka

(57) ABSTRACT

An ultrasound probe diagnosing apparatus for diagnosing an ultrasound probe having a probe head comprising a plurality of transducer elements is disclosed. The ultrasound probe diagnosing apparatus includes a reflective interface configured to reflect ultrasonic signals transmitted from a transducer element of the plurality of transducer elements. The reflected ultrasonic signals are received by at least one transducer element present in the probe head. A probe diagnosis unit is communicably coupled to the plurality of transducer elements. The probe diagnosis unit is configured to analyze at least one signal parameter associated with the reflected ultrasonic signals received for diagnosing performance of the transducer element.

8 Claims, 8 Drawing Sheets

(56) References Cited

U.S. PATENT DOCUMENTS

| | | | |
|---|---|---|---|
| 2012/0226164 A1* | 9/2012 | Tashiro | A61B 8/0841 600/461 |
| 2012/0271573 A1* | 10/2012 | Markoff | A61B 6/583 702/59 |
| 2012/0320710 A1* | 12/2012 | Sato | A61B 8/4483 367/7 |

* cited by examiner

ULTRASOUND PROBE DIAGNOSING SYSTEM AND METHOD FOR DIAGNOSING ULTRASOUND PROBE

TECHNICAL FIELD

The subject matter disclosed herein relates to ultrasound imaging systems for performing imaging on subjects. More specifically, relates to an ultrasound probe diagnosing system for diagnosing an ultrasound probe.

BACKGROUND OF THE INVENTION

A conventional ultrasound imaging system comprises an ultrasound probe including an array of transducer elements for transmitting an ultrasound beam and receiving a reflected ultrasound beam from the object being studied. By selecting the phase delay and amplitude of the applied voltages, the individual transducer elements can be controlled to produce ultrasonic waves which combine to form a net ultrasonic wave that travels along a preferred vector direction and is focused at a selected point along the beam. Multiple firings may be used to acquire data representing the same anatomical information. When used defects are common for the transducer elements, and however these defects are detected at a late stage. Each transducer element has a life cycle and its performance degrades based on usage. Currently failure of the ultrasound probe is identified after all the transducer elements fails to function. This consumes more time for an end-user to replace the ultrasound probe.

Various probe diagnosing systems are available however the ultrasound probe needs to be fixed separate jigs and diagnosed in a confined chamber. These systems are complex and used for diagnosing ultrasound probes once they fail. Thus the ultrasound probe may malfunction at any instance and causes inconvenience to the end-user. Hence, there is a need for an improved ultrasound probe diagnosing system for diagnosing an ultrasound probe.

BRIEF DESCRIPTION OF THE INVENTION

The above-mentioned shortcomings, disadvantages and problems are addressed herein which will be understood by reading and understanding the following specification.

In an embodiment an ultrasound probe diagnosing apparatus for diagnosing an ultrasound probe having a probe head comprising a plurality of transducer elements is disclosed. The ultrasound probe diagnosing apparatus includes a reflective interface configured to reflect ultrasonic signals transmitted from a transducer element of the plurality of transducer elements. The reflected ultrasonic signals are received by at least one transducer element present in the probe head. A probe diagnosis unit is communicably coupled to the plurality of transducer elements. The probe diagnosis unit is configured to analyze at least one signal parameter associated with the reflected ultrasonic signals received for diagnosing performance of the transducer element.

In another embodiment an ultrasonic probe diagnosing system for diagnosing an ultrasound probe having a probe head comprising a plurality of transducer elements is disclosed. The ultrasonic probe diagnosing system includes a diagnosis module for analyzing at least one signal parameter associated with at least one ultrasonic signal received by at least one transducer element of the plurality of transducer elements. The ultrasound probe is positioned proximal to a reflective interface configured to reflect the at least one ultrasonic signal transmitted from a transducer element of the plurality of transducer elements. A presentation module for presenting performance of the transducer element to a user based on analysis of the at least one ultrasonic signal.

In yet another embodiment a method of diagnosing an ultrasound probe having a probe head comprising a plurality of transducer elements is disclosed. The method includes transmitting ultrasonic signals by a transducer element of the plurality of transducer elements; reflecting the ultrasonic signals by a reflective interface positioned proximal to the probe head; receiving reflected ultrasonic signals by one or more of the transducer element and at least one transducer element present in the probe head; and analyzing performance of the transducer element based on at least one signal parameter associated with the reflected ultrasonic signals.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

As discussed in detail below, embodiments of the invention including an ultrasound probe diagnosing apparatus for diagnosing an ultrasound probe having a probe head comprising a plurality of transducer elements is disclosed. The ultrasound probe diagnosing apparatus includes a reflective interface configured to reflect ultrasonic signals transmitted from a transducer element of the plurality of transducer elements. The reflected ultrasonic signals are received by at least one transducer element present in the probe head. A probe diagnosis unit is communicably coupled to the plurality of transducer elements. The diagnosis unit is configured to analyze at least one signal parameter associated with the reflected ultrasonic signals received for diagnosing performance of the transducer element.

Figure 1:
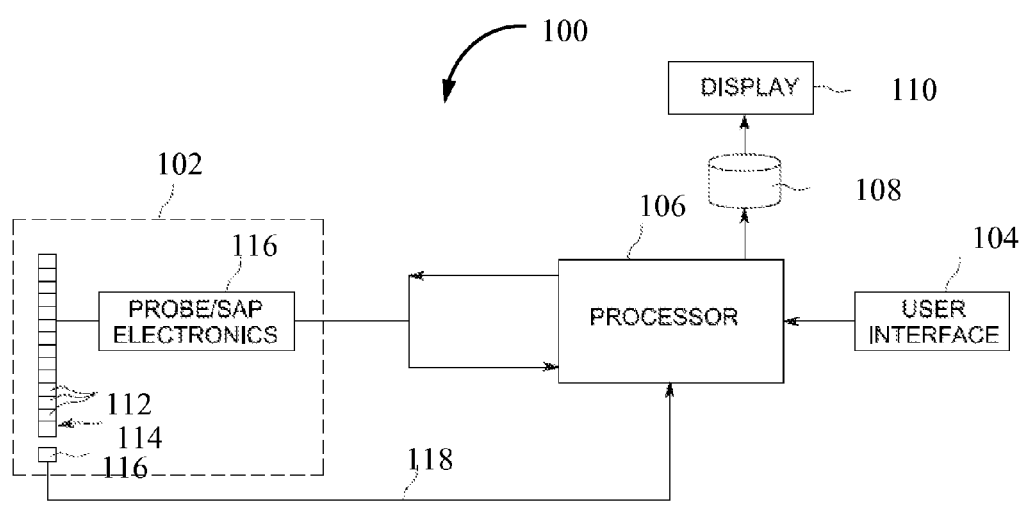
FIG. 1 is a schematic diagram of an ultrasound imaging system in accordance with an embodiment.

FIG. 1 is a schematic diagram of an ultrasound imaging system 100. The ultrasound imaging system 100 includes an ultrasound probe 102, a user interface 104, a processor 106, a memory 108, and a display 110. The ultrasound probe 102 includes a plurality of transducer elements 112 arranged in a transducer array 114, and probe/sub-aperture processor (SAP) electronics 116, hereinafter probe/SAP electronics 116. While the schematic diagram of FIG. 1 only shows 10 transducer elements 112 in the transducer array 114, it should be appreciated that other embodiments may have transducer arrays with significantly more transducer elements. Also, a variety of geometries of transducer arrays may be used. The probe/SAP electronics 116 may be used to control the switching of the elements 112. The probe/SAP electronics 116 may also be used to group the elements 112 into one or more sub-apertures. According to an embodiment, the processor 106 may perform the transmit beamforming on the signals that are sent to the transducer array 114. The transmit beamforming applies the appropriate time delays to the transducer elements 112 in the transducer array 114 in order to focus the ultrasound beam at the intended location. The processor 106 may also perform receive beamforming on the signals from the transducer array 114. Other embodiments may use separate dedicated components to perform one or both of the transmit beamforming and the receive beamforming. The transducer elements 112 in the transducer array 114 emit ultrasonic signals into the tissue of the patient being examined. The ultrasonic signals are back-scattered from structures in the body, like blood cells or muscular tissue, to produce echoes that return to the elements 112. The echoes are converted into electrical signals, or ultrasound data, by the elements 112 and the electrical signals are received by the processor 106. For purposes of this disclosure, the term ultrasound data may include the processed or unprocessed data that was acquired by an ultrasound imaging system. The electrical signals may be processed to remove electromagnetic noise by the processor 106, forming noise-cancelled signals. Then the processor 106 may apply beamforming to the noise-cancelled signals. The user interface 104 may be used to control operation of the ultrasound imaging system 100, including, to control the input of patient data, to change a scanning or display parameter, and the like.

The processor 106 may also be used to process the ultrasound data and prepare frames of ultrasound information for display on the display 110. The processor 106 may be adapted to perform one or more processing operations on the ultrasound information according to a plurality of selectable ultrasound modalities. The ultrasound information may be processed in real-time during a scanning session as the echo signals are received. For the purposes of this disclosure, the term "real-time" is defined to include a procedure that is performed without any intentional delay. Additionally or alternatively, the ultrasound information may be stored temporarily in a buffer (not shown) during a scanning session and processed in less than real-time in a live or off-line operation. Some embodiments of the invention may include multiple processors (not shown) to handle the processing tasks. For example, a first processor may be utilized to demodulate and decimate the ultrasound signal while a second processor may be used to further process the data prior to displaying an image. It should be appreciated that other embodiments may use a different arrangement of processors.

According to an embodiment, the ultrasound probe 102 of ultrasound imaging system 100 may optionally include a sensor 116. Other embodiments may include probes with multiple sensors. The sensor 116 may be connected to the processor 106 by an electrical connection 118. The sensor 116 is adapted to detect an electromagnetic noise signal while the transducer array 114 is detecting ultrasonic energy. The sensor 116 is connected to the processor 106, so that the processor 106 may use the information regarding the electromagnetic noise signal when processing signals from the transducer array 106. The sensor 116 is shown as being adjacent to the transducer array 114. However, in other embodiments, the sensor 116 may be located elsewhere on an ultrasound probe.

Still referring to FIG. 1, the ultrasound imaging system 100 may continuously acquire ultrasound information at a frame rate of, for example, 20 Hz to 60 Hz. However, other embodiments may acquire ultrasound information at a different rate. For example, some embodiments may acquire ultrasound information at a rate slower than 20 Hz while other embodiments may acquire ultrasound information at a rate faster than 60 Hz. The memory 108 is included for storing processed frames of acquired ultrasound information that are not scheduled to be displayed immediately. In an exemplary embodiment, the memory 108 is of sufficient capacity to store at least several seconds worth of frames of ultrasound information. The frames of ultrasound information are stored in a manner to facilitate retrieval thereof according to its order or time of acquisition. The memory 108 may comprise any known data storage medium.

In various embodiments of the present invention, ultrasound information may be processed by other or different mode-related modules (e.g., B-mode, Color Doppler, power Doppler, M-mode, spectral Doppler anatomical M-mode, strain, strain rate, and the like) to form 2D or 3D data sets of image frames and the like. For example, one or more modules may generate B-mode, color Doppler, power Doppler, M-mode, anatomical M-mode, strain, strain rate, spectral Doppler image frames and combinations thereof, and the like. The image frames are stored and timing information indicating a time at which the image frame was acquired in memory may be recorded with each image frame. The modules may include, for example, a scan conversion module to perform scan conversion operations to convert the image frames from Polar to Cartesian coordinates. A video processor module may be provided that reads the image frames from a memory and displays the image frames in real time while a procedure is being carried out on a patient. A video processor module may store the image frames in an image memory, from which the images are read and displayed.

Figure 2:
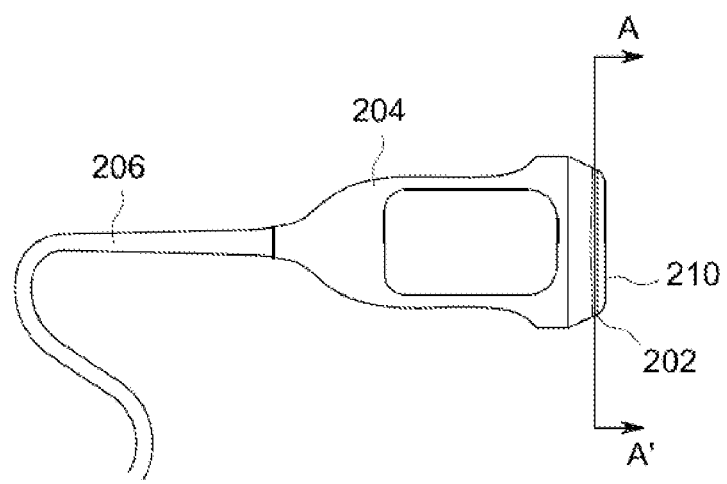
FIG. 2 is a schematic representation of an ultrasound probe in accordance with an embodiment.

Referring to FIG. 2, a schematic representation of an ultrasound probe is shown in accordance with an embodiment. The ultrasound probe 200 includes a transducer array 202 disposed in a housing 204. A cord 206 is attached to the housing 204.

Figure 3:
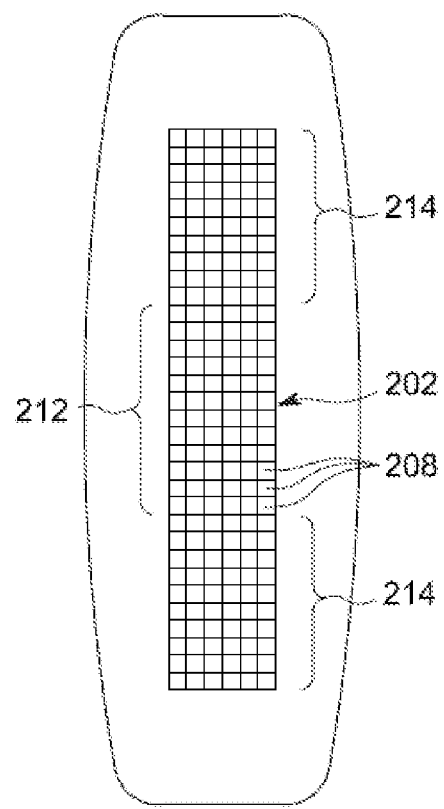
FIG. 3 is a schematic representation of a sectional view of an ultrasound probe in accordance with an embodiment.

FIG. 3 is a schematic representation of a sectional view of the ultrasound probe 200 along the line A-A' according to an embodiment. Common components will be labeled with the same reference number in both FIG. 2 and FIG. 3.

Referring to both FIG. 2 and FIG. 3, the transducer array 202 may be a linear array comprising 192 transducer elements 208. According to an embodiment, the transducer elements 208 may be arranged in a grid that is 6 transducer elements wide by 32 transducer elements tall. It should be appreciated by those skilled in the art that additional embodiments might include transducer arrays of different arrangements. For example, additional embodiments may use transducer arrays including a curved transducer array, a matrix transducer array, and a mechanical 3D transducer array depending upon the intended use of the probe.

The transducer array 202 is positioned behind an acoustic lens 210 that is used to help shape ultrasound waves that are emitted from the transducer array 202. The transducer elements 208 are divided into a central region 212, and a pair of edge regions 214. According to the embodiment shown, the central region 212 includes the 12 rows of elements in the center and the edge regions 214 include the 10 rows of elements on either side of the central region 212. During most imaging modes of phased array probes, the phase delays applied to the transducer elements in the central region 212 are all relatively similar. By comparison, due to their distance from the central region 212, the transducer elements in the edge regions 214 may have significantly different phase delays applied to the signals from each of the elements. It should be appreciated by those skilled in the art that the exact size of the edge regions 214 may vary depending upon the type of transducer and the selected imaging mode. For purposes of this disclosure, the edge regions may include one or more regions that are positioned away from the center of the transducer array. The edge regions may also include two or more regions separated from each other by a central region, or an edge region may form a continuous ring or rectangular frame around a central region in a matrix probe.

Figure 4:
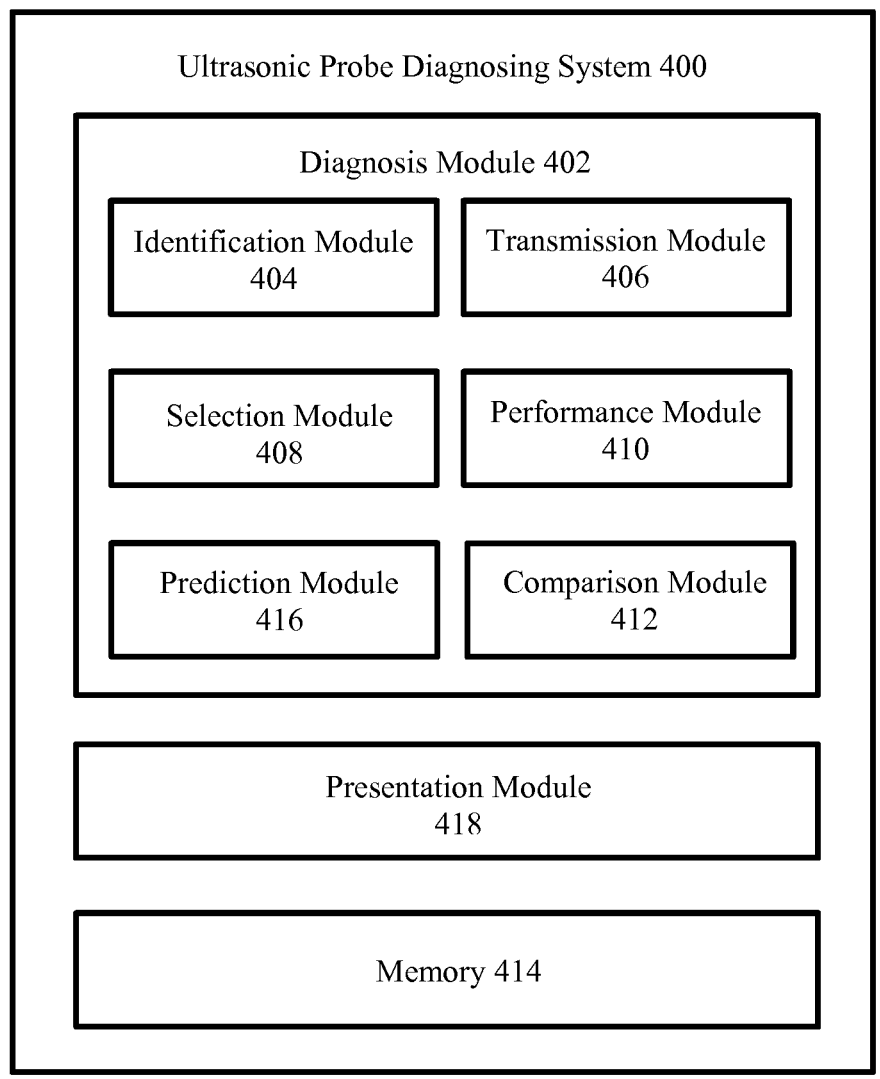
FIG. 4 is a schematic illustration of a block diagram of an ultrasound probe diagnosing system in accordance with an embodiment.

FIG. 4 illustrates a block diagram of an ultrasound probe diagnosing system 400 for diagnosing an ultrasound probe in accordance with an embodiment. The ultrasound probe includes a plurality of transducer elements (also referred to as a transducer array) and is positioned proximal to a reflective interface configured to reflect one or more ultrasonic signals transmitted from a transducer element of the plurality of transducer elements. The ultrasound probe is positioned at a predefined distance from the reflective interface. The reflective interface and its position are further explained in detail in conjunction with FIGS. 5 and 6. Multiple pulse signals are input to each transducer elements for generating ultrasonic signals. A frequency of the pulse signal is a center frequency of the ultrasound probe. The ultrasonic signals may be transmitted from the transducer elements simultaneously or with any phase or time delays. The ultrasonic signals from the transducer element are reflected by the reflective interface and received by one or more transducer elements. The one or more transducer elements include the same transducer element that transmits the ultrasonic signals or any transducer elements adjacent to the transducer element or any other transducer elements in the ultrasound probe. The ultrasound probe diagnosing system 400 includes a diagnosis module 402 for diagnosing the ultrasonic signals received by the one or more transducer elements. During diagnosis one or more signal parameters associated with the ultrasonic signals are measured. The one or more signal parameters include for example but not limited to frequency and amplitude. In an embodiment the transducer element that needs to be diagnosed may be identified by an identification module 404. The identification or selection of the transducer element may be based on user's input or performed automatically. The transducer element is identified from the plurality of transducer elements. It may be noted that multiple transducer elements may be selected for diagnosis simultaneously or in any order. A transmission module 406 transmits one or more pulse signals to the identified transducer element. The pulse signals energize or activate the transducer element to generate and transmit the one or more ultrasonic signals. The voltage of the pulse signals may be set by the diagnosis module 402. The voltage may be set based on user input. Based on the voltage of the pulse signal the strength (i.e. frequency and amplitude) of the one or more ultrasonic signals may vary. The one or more transducer elements that receive the one or more ultrasonic signals are selected by a selection module 408. The one or more transducer elements may be selected based on user input.

Now referring back to analyzing or diagnosing the one or more ultrasonic signals, based on this analysis a performance module 410 determines a performance degradation level associated with the transducer element. The performance degradation level of each transducer element may be determined based on transducer element's transmit and receive capability or performance. The performance degradation level is determined based on the one or more signal parameters. For instance one or more signal parameters associated with ultrasonic signals received and transmitted by the transducer element are diagnosed. If the one or more signal parameters are weak then it indicates that the transducer element is degrading. In an embodiment a signal parameter measured and analyzed may be compared with a predefined parameter threshold. This comparison process is performed by a comparison module 412 and comparison information is communicated to the performance module 410. Each signal parameter may be compared against a corresponding predefined parameter threshold. If the signal parameter is below the predefined parameter threshold then the transducer element is identified as degrading. Further the degree to which the signal parameter is below the predefined parameter threshold may indicate a degradation level of the transducer element. In an exemplary embodiment the performance module 410 may categorize the transducer elements in multiple degradation levels such as, a high degradation level, a medium degradation level and a low degradation level. However it may be envisioned that other degradation levels may be also within the scope of this disclosure and accordingly the transducer elements may be categorized. It may also be noted that the performance module 410 identifies the degradation levels and may not categorize the transducer elements in different degradation levels.

Figure 5:
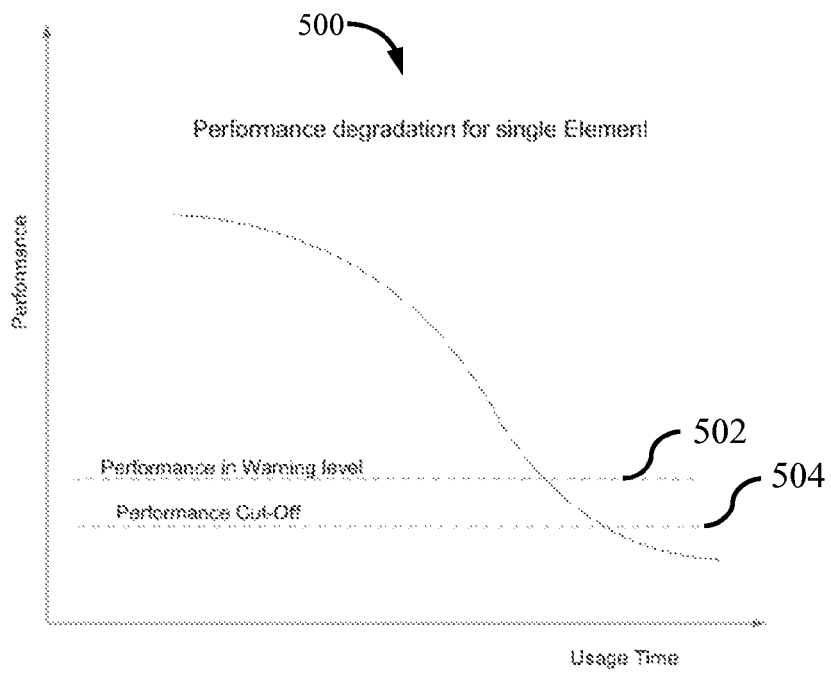
FIG. 5 is a schematic illustration of a degradation curve.

In an embodiment the diagnosis of each transducer element may be performed at predefined time intervals. For example a transducer element may be diagnosed for its performance after every 100 hours or after every 25 usage cycles. The predefined time intervals may be defined by the user or in another instance the diagnosis module 402 may perform the diagnosis based on a diagnosis schedule. The diagnosis schedule may be stored in a memory 414. The diagnosis information from the performance module 410 is used by a prediction module 416 for predicting performance degradation trend associated with the transducer element over a predetermined time period. The diagnosis information includes performance degradation levels associated with the transducer element at the predefined time intervals. These performance degradation levels facilitate the prediction module 416 to predict a degradation path and time required for complete degradation or failure of the transducer element. The time required for complete degradation is the predetermined time period. The performance degradation trend may also indicate for example number of usage cycles remaining for the transducer element, and number of firing cycles remaining for the transducer element. The performance degradation trend associated with each transducer element is presented to a user by a presentation module 418. The performance degradation trend may be presented in various forms such as but not limited to degradation or performance curves or graphs, and degradation trend values. A degradation curve is illustrated in FIG. 5 in accordance with an embodiment. A degradation curve 500 is presented in terms of performance of a transducer element and usage time. The degradation trend values may include but not limited to number of usage cycles remaining, number of firing cycles remaining, frequency and amplitude values. The performance degradation trend may be presented through a display device of an ultrasound imaging system. A degradation curve is generated for each transducer element indicating performance degradation trend of the transducer element. The degradation curve 500 indicates that the performance of the transducer element reduces after passage of time (i.e. usage time) and may reach a warning level 502. The prediction module 416 identifies the warning level 502 and interprets that the transducer element is performing is nearing to failure. Now when the degradation curve 500 goes below a performance cut-off level 504. This indicates that the transducer element has failed.

In an embodiment the performance degradation trend may be presented in the form of a report to the user. The report may also include the degradation curve and the degradation values associated with a transducer element. The user can view the degradation trend to understand when transducer elements will fail and the lifespan of the ultrasound probe. Accordingly the user can schedule for a repair or replacement of the ultrasound probe or transducer elements. The prediction module 416 is further configured to log and store the performance degradation trend in the memory 414. Based on the performance degradation trend, the prediction module 416 may present notifications to the user through the display device. The notifications may be alerts to the user for a repair or replacement of the ultrasound probe or the transducer elements.

In an exemplary embodiment the diagnosis module 402 may be configured to communicate the performance degradation trend over a wired and/or a wireless network to a remote location where a customer service center may be present. A person in the customer service center may have access to the performance degradation trend to determine when a repairmen or replacement of the ultrasound probe is required. The wireless network 210 may include but are not limited to, a Local Area Network (LAN), a wireless LAN (WLAN), a Wireless Wide Area Network (Wireless WAN), a Wireless Personal Area Network (Wireless PAN), a Wireless Metropolitan Area Network (Wireless MAN), a Wireless Telecommunication Network, a $3^{rd}$ Generation communication (3G) network, a $4^{th}$ Generation communication (4G) network, and a Long Term Evolution communication (4G LTE) network. In another embodiment the notifications in the form of alerts may be communicated to the customer service center over the wired and/or wireless network.

Figure 6:
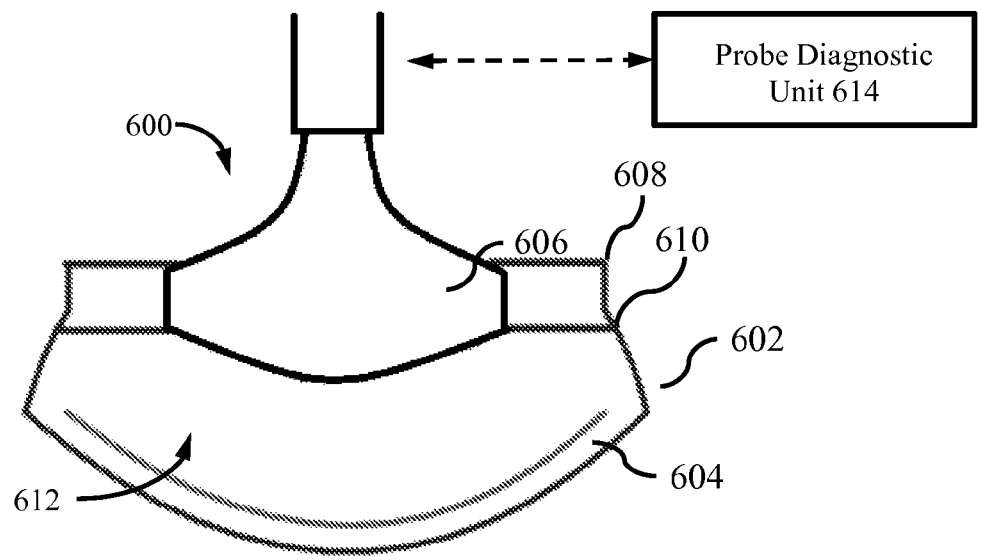
FIG. 6 is a schematic illustration of an ultrasound probe having a probe casing in accordance with an embodiment.

The diagnosis of the ultrasound probe as discussed with respect to FIG. 4 needs a reflective interface and the ultrasound probe diagnosing system 400. The reflective interface is positioned at the predefined distance from the multiple transducer elements in the ultrasound probe. In order to position the reflective interface, in an embodiment a probe casing having the reflective interface may be placed to cover a probe head. FIG. 6 illustrates an ultrasound probe 600 having a probe casing 602 in accordance with an embodiment. The probe casing 602 includes a reflective interface 604 positioned proximal to a probe head 606. In an embodiment the reflective interface 604 may be positioned at a predefined distance for example 10 mm from the probe head 606. However it may be envisioned that the predefined distance between the reflective interface 604 and the probe head 606 may vary to accommodate convenient reflection of the ultrasonic signals by the reflective interface back to the transducer elements so that the performance of these transducer elements can be determined. The probe casing 602 include multiple locking members such as locking members 608 and locking members 610. The locking members 608 ensure that the probe head 606 is positioned at the predefined distance from the reflective interface 604. Whereas the locking members 610 lock the probe casing 602 to the probe head 606.

The reflective interface 604 may be composed of a metal. The metal may be for example hardened aluminum. The reflective interface 604 may have different shapes based on the shape of the probe head 606. As shown in FIG. 6, the probe head 606 have a convex shape and the reflective interface 604 also have a convex shape. The convex shape is provided so that all transducer elements are positioned equidistant from the reflective interface 604 i.e. the predefined distance. The probe casing 602 includes an acoustic layer 612 positioned above the reflective interface 604. The acoustic layer 612 may be placed on an outer surface of the probe head 606 after applying a layer of acoustic gel on the outer surface. Thereafter the probe casing 602 is placed on the acoustic layer 612 so as to compress this layer. The acoustic layer 612 may be a soft tissue material that may have a convex shape or may be capable of taking a shape to match the shape of the reflective interface 604 and the probe head 606. More specifically the acoustic layer 612 abuts to the outer surface of the probe casing 602 and the reflective interface 604 thereby ensuring proper ultrasonic coupling between the probe head 606 and the reflective interface 604 avoiding any air gaps or air bubbles. In an embodiment the surface of the acoustic layer 612 may be impedance matched with lens in the probe head 606. The acoustic layer 612 may include for example soft plastic materials, plastisols, urethane, and other polymer materials. The probe diagnostic unit 614 and the probe casing 602 including the reflective interface 604 and the acoustic layer 612 form an ultrasound probe diagnosing apparatus.

In order to diagnose the performance of transducer elements in the probe head 606, pulse signals are supplied to the transducer elements by a probe diagnostic unit 614 present in the ultrasound probe 600. The transducer elements emit or transmit ultrasonic signals that are reflected by the reflective interface 604. Now considering a transducer element, ultrasonic signals transmitted by this element and reflected are received at one or more transducer elements adjacent to the transducer element and the transducer element themselves. The probe diagnostic unit 614 analyzes the received ultrasonic signals to measure their one or more signal parameters. The one or more signals parameters as discussed earlier include for example frequency and amplitude. For instance the probe diagnostic unit 614 identifies amplitude associated with the reflected ultrasonic signal and then compares it with a predefined amplitude threshold. If the amplitude is less than the predefined amplitude threshold then it indicates the transducer element in degrading. The predefined amplitude threshold is the minimum amplitude associated with an ultrasonic signal that may be received at a transducer element after reflecting from the reflective interface. A scale of difference between the amplitude value and the predefined amplitude threshold indicates a degradation level associated with the transducer element. More specifically a higher difference between the amplitude value and the predefined amplitude threshold indicates a higher degradation level. The probe diagnostic unit 614 may schedule diagnosis of the transducer elements at predefined time intervals. In another embodiment based on user's input the diagnostic unit 614 performs the diagnosis. In this case the predefined time intervals may be decided by the user. The diagnosis information gathered is used to predict the performance degradation trend in terms of degradation in amplitude of the ultrasonic signals generated by the transducer element.

Figure 7:
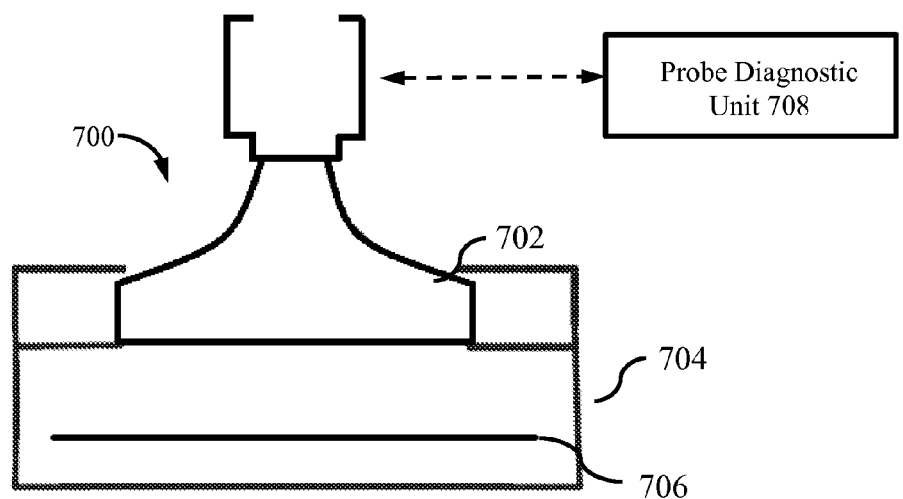
FIG. 7 is a schematic illustration of an ultrasound probe having a probe head with a flat shape in accordance with an embodiment.

Turning now to FIG. 7 that illustrates an ultrasound probe 700 having a probe head 702 with a flat shape in accordance with an embodiment. The probe head 702 is covered by a probe casing 704 having a flat configuration internally to accommodate the flat shape of the probe head 702. The probe head 702 includes a reflective interface 706. The ultrasound probe 700 also includes a probe diagnostic unit 708 for diagnosing transducer elements in the probe head 702. The probe diagnostic unit 708 functions in a similar manner as a probe diagnostic unit 614 present in the ultrasound probe 600. Hence the function and operation of the ultrasound probe 700 and the probe diagnostic unit 708 are not explained in detail here. Moreover it may be noted that ultrasound probes including different probe heads having different shapes such as 3D, TV, sector, linear, curvilinear, and phased array may be used and accordingly the shape of the probe casing 704 may vary to accommodate these shapes of the probe heads.

Figure 8:
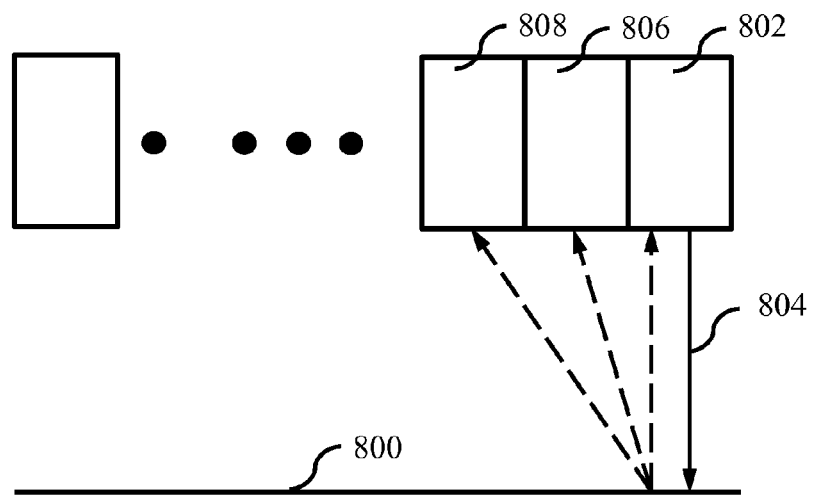
FIG. 8 is a schematic illustration of a plurality of transducer elements arranged proximal to a reflective interface in accordance with an embodiment.

Now referring to FIG. 8, this figure is a schematic illustration of a plurality of transducer elements arranged proximal to a reflective interface 800 in accordance with an embodiment. The plurality of transducer elements includes a transducer element 802 transmitting an ultrasonic signal 804 to the reflective interface 800. The ultrasonic signal 804 reflects from the reflective interface 800 and is received at a transducer element 806. The reflected ultrasonic signal 804 is diagnosed by a probe diagnostic unit to measure one or more signal parameters associated with the ultrasonic signals. The reflected ultrasonic signal 804 is received by adjacent transducer elements such as a transducer element 806 and other transducer elements for example a transducer element 808. Adjacent transducer elements are selected as they are closer and more accurate in receiving the ultrasonic signals with fewer losses and also the distance is not too large to delay signal receive time. The reflected ultrasonic signal 804 may be received by other transducer elements as well. Signal parameters of the reflected ultrasonic signal 804 received at each transducer element are analyzed and performance degradation of the transducer element 802 is determined. The performance degradation is associated with transmission capability of the transducer element 802. Considering now the signal parameter measured is amplitude, the amplitude of the reflected ultrasonic signal 804 received at the transducer element 806 and the transducer element 808 is measured and compared with a predefined amplitude threshold. The predefined amplitude threshold is the minimum amplitude associated with an ultrasonic signal that may be received at an adjacent transducer element after reflecting from the reflective interface. In an embodiment a predefined amplitude threshold may be different for the transducer element 806 and the transducer element 808 based on their distance from the transducer element 802.

The transducer element 802 may generate the ultrasonic signals 804 and are received at the transducer element 806 and the transducer element 808 multiple times to predict a performance degradation trend of the transducer element 802. The performance degradation trend indicates a degradation path of the transducer element 802. The performance degradation trend may indicate for example a usage or operation time remaining, and number of firing cycles remaining for the transducer element 802. The performance degradation trend may be presented to the user in the form for example, a performance degradation curve. The performance degradation curve facilitates the user to identify when a transmission capability of the transducer element 802 will fail to function. In an embodiment the performance degradation trend may be logged in an ultrasound probe diagnosing system.

Figure 9:
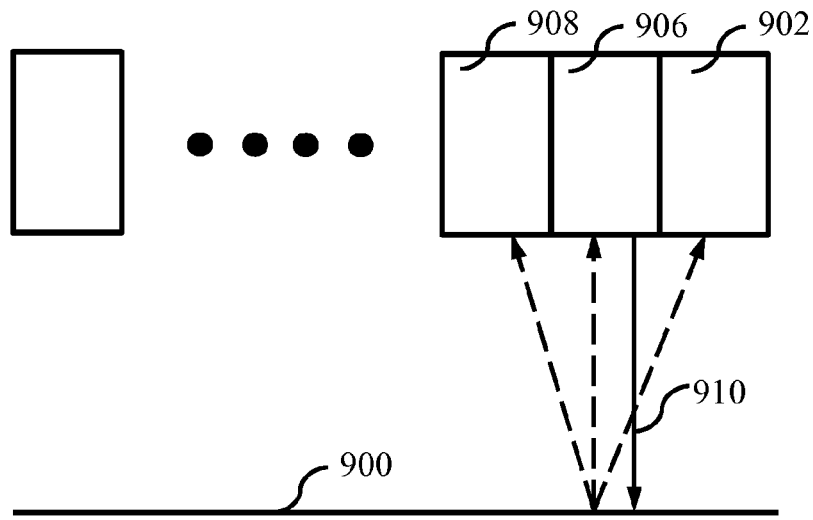
FIG. 9 illustrates a plurality of transducer elements arranged proximal to the reflective interface for diagnosing receiving capability of the transducer elements in accordance with an embodiment.

The performance degradation associated with the transducer elements are also analyzed based on their receiving capability. FIG. 9 illustrates the plurality of transducer elements arranged proximal to the reflective interface 900 for diagnosing receiving capability of the transducer elements in accordance with an embodiment. As shown in the FIG. 9 the transducer element 906 transmits an ultrasonic signal 910 that is reflected by the reflective interface 900 and received at the transducer element 902, the transducer element 906 and the transducer element 908. The probe diagnostic unit diagnosis the ultrasonic signals received at these transducer elements to determine their one or more signal parameters. For instance amplitude of an ultrasonic signal received at a transducer element 902 is measured and compared with a predefined amplitude threshold. If the amplitude is less than the predefined amplitude threshold then it indicates that the receive capability of the transducer element 902 is degraded. A degree of difference of the amplitude and the predefined amplitude threshold indicates a performance degradation level associated with the transducer element 902. In an embodiment the transducer element 902 may be categorized in multiple degradation levels such as, a high degradation level, a medium degradation level and a low degradation level. The transducer element 906 may generate the ultrasonic signals 910 and is received at the transducer element 902 multiple times to predict a performance degradation trend of the transducer element 902. Thus the receive capability of the transducer element 702 is measured over a predefined period of time and accordingly the performance degradation trend is presented to the user. In an embodiment the predefined amplitude threshold may be different for the transducer element 902 and the transducer element 908 based on their distance from the transducer element 906. The user views the performance degradation trend and determines a usage or operation time remaining in terms of receive capacity or capability for the transducer element 902. Similarly the performance degradation trend indicating degradation in receive capability of the transducer element 906 and the transducer element 908 are determined by the probe diagnostic unit.

In an embodiment an overall performance degradation trend is presented to the user based on performance degradation in terms of transmit and receive capability of the transducer elements. Here a transmit performance degradation and a received performance degradation associated with each transducer element are combined to generate an overall performance degradation trend of the transducer element. For purpose of this disclosure and as an example performance degradation trend is explained in FIG. 8 and FIG. 9 with respect to a signal parameter i.e. amplitude, thus performance degradation trend may be identified based on other signal parameters which is within the scope of this disclosure.

Figure 10:
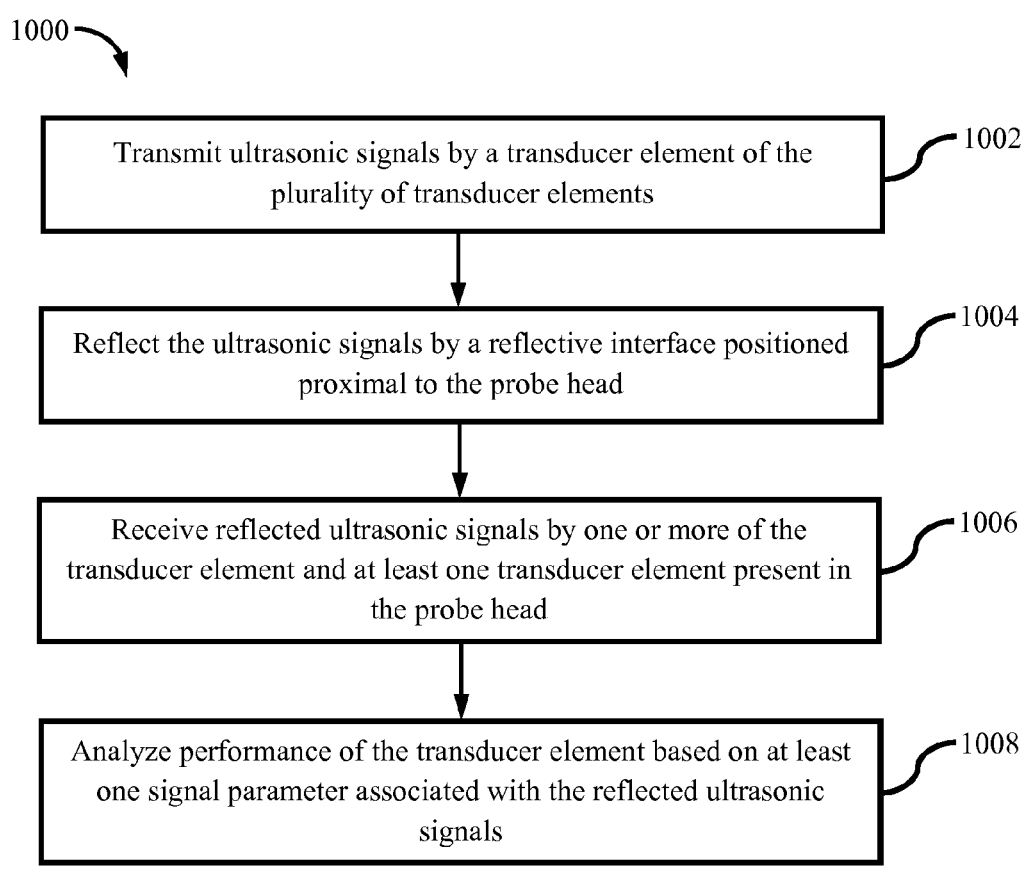
FIG. 10 illustrates a block diagram of a method of diagnosing an ultrasound probe having a probe head comprising a plurality of transducer elements in accordance with an embodiment.

FIG. 10 illustrates a block diagram of a method 1000 of diagnosing an ultrasound probe having a probe head comprising a plurality of transducer elements in accordance with an embodiment. A probe casing having a reflective interface is placed to cover the probe head. The reflective interface is positioned proximal to the probe head. At step 1002 a transducer element of the plurality of transduce elements transmit ultrasonic signals. The ultrasonic signals reflect from the reflective interface at step 1004. The reflected ultrasonic signals are received by one or more of the transducer element and one or more other transducer elements (such as transducer elements adjacent to the transducer element that transmitted the ultrasonic signals) at step 1006. Thereafter performance of the transducer element is analyzed based on one or more signal parameters of the reflected ultrasonic signals ate step 1008.

Figure 11:
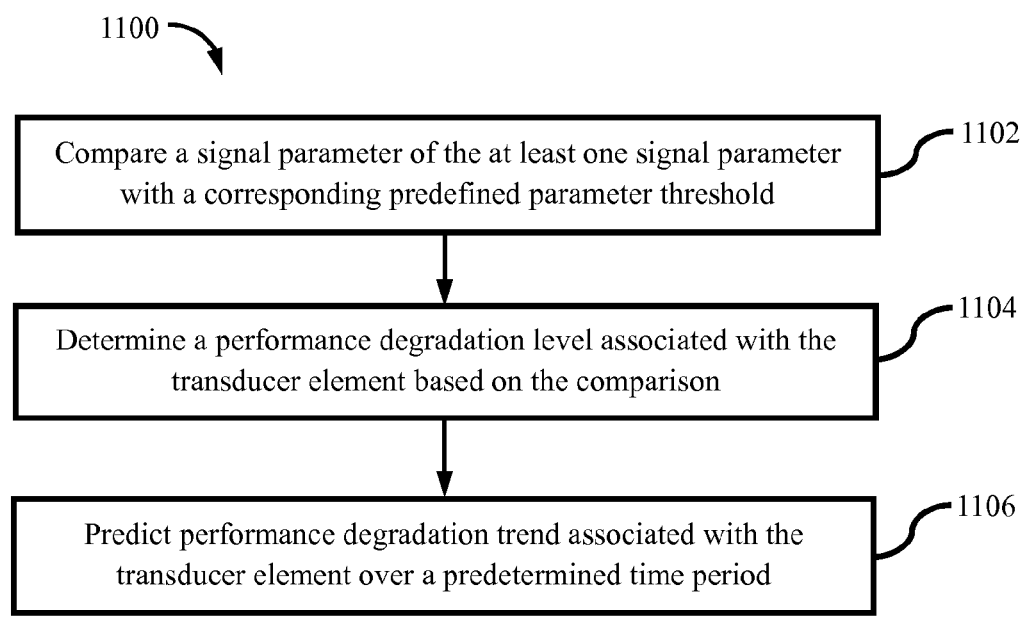
FIG. 11 illustrates a block diagram of a method for determining a performance degradation trend of the transducer element based on the one or more signal parameters in accordance with an embodiment.

FIG. 11 illustrates a block diagram of a method 1100 for determining a performance degradation trend of the transducer element based on the one or more signal parameters in accordance with an embodiment. A signal parameter is compared with a corresponding predefined parameter threshold at step 1102. Based on the comparison a performance degradation level associated with the transducer element is determined at step 1104. The performance degradation level based on a transmission and receive capability of transducer element is determined. For example the ultrasonic signals transmitted by a transducer element are received by the transducer element and the adjacent transducer elements. Amplitude associated with ultrasonic signals is received is compared with a predefined amplitude threshold. Each transducer element that receives the ultrasonic signals may have separate predefined amplitude thresholds based on their distance from the transducer element. Based on this comparison the performance degradation level indicating the transmission capability of the transducer element is determined. Similarly amplitude of ultrasonic signals received by multiple transducer elements are also compared with corresponding predefined amplitude thresholds to determine the performance degradation level indicating the receive capability of the transducer element. This is explained in detail in conjunction with FIG. 8 and FIG. 9. Using these performance degradation levels indicating the transmission and receive capability a performance degradation trend associated with the transducer element is predicted at step 1106. The performance degradation trend is predicted over a predefined time period. The performance degradation trend is presented to the user. The user can then identify the performance of the probe head and each transducer element.

Figure 12:
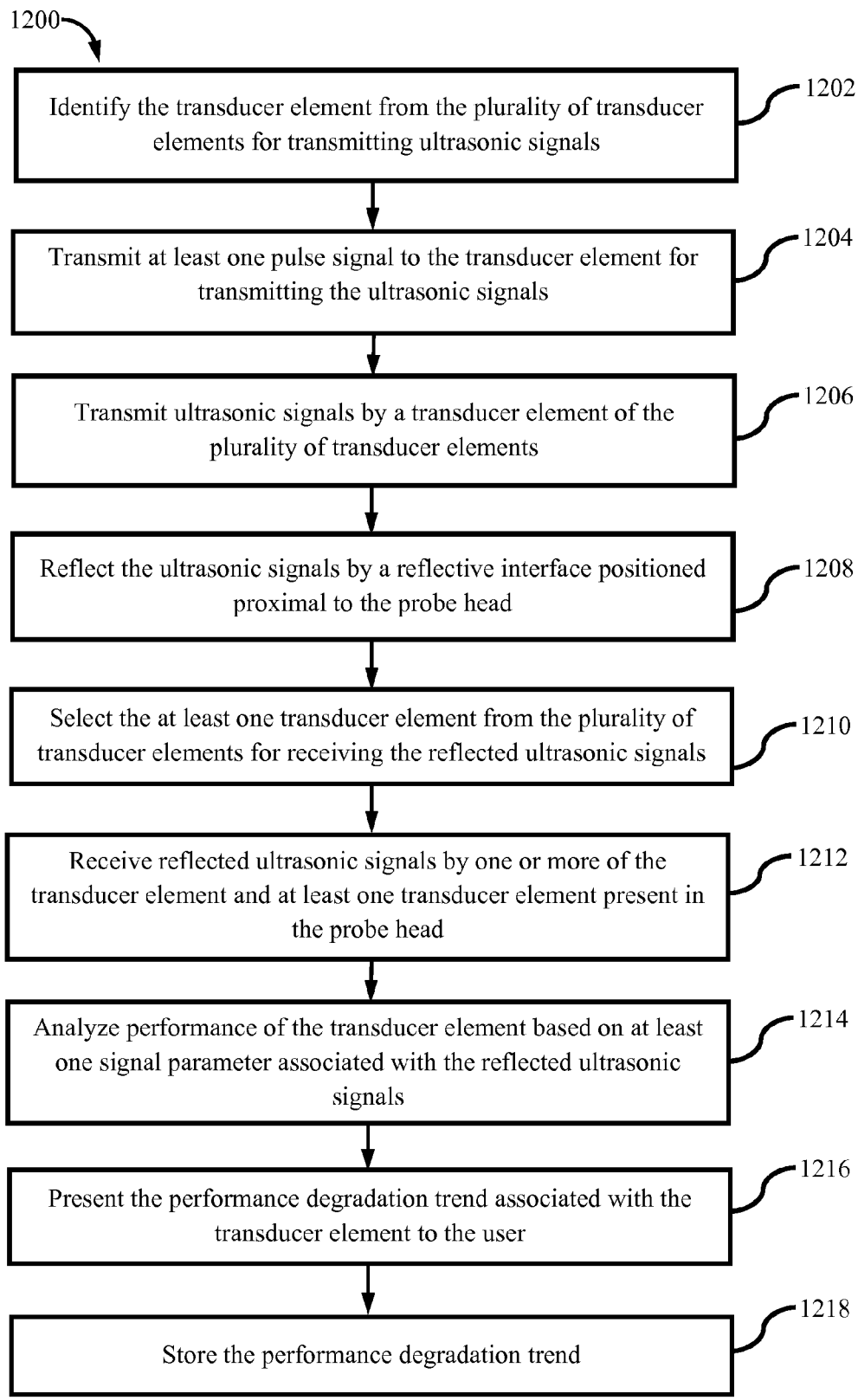
FIG. 12 illustrates a block diagram of a method of diagnosing an ultrasound probe having a probe head comprising a plurality of transducer elements in accordance with another embodiment.

FIG. 12 illustrates a block diagram of a method 1200 of diagnosing an ultrasound probe having a probe head comprising a plurality of transducer elements in accordance with another embodiment. At step 1202 a transducer element to be diagnosed is identified from the plurality of transducer elements. The transducer element is selected for transmitting ultrasonic signals having one or more signal parameters that are desired. According to the desired signal parameters one or more pulse signals need to be transmitted to the transducer element at step 1204. At step 1206 a transducer element of the plurality of transducer elements transmits ultrasonic signals. The ultrasonic signals reflect from the reflective interface at step 1208. One or more transducer elements are selected from the plurality of transducer elements for receiving the reflected ultrasonic signals at step 1210. The selected transducer elements include the transducer element and one or more other transducer elements (such as transducer elements adjacent to the transducer element that transmitted the ultrasonic signals). The reflected ultrasonic signals are received by selected transducer elements at step 1212.

Thereafter performance of the transducer element is analyzed based on one or more signal parameters of the reflected ultrasonic signals ate step 1214. In this analysis a signal parameter is compared with a corresponding predefined parameter threshold. Based on the comparison a performance degradation level associated with the transducer element is determined. The performance degradation level based on a transmission and receive capability of transducer element is determined. Using these performance degradation levels indicating the transmission and receive capability a performance degradation trend associated with the transducer element is predicted and presented to the user at step 1216. The performance degradation trend is predicted over a predefined time period. The user can then identify the performance of the probe head and each transducer element. The performance degradation trend is stored at step 1218 in a memory of the ultrasound probe diagnosing system.

The methods 1000, 1100 and 1200 can be performed using a processor or any other processing device. The method steps can be implemented using coded instructions (e.g., computer readable instructions) stored on a tangible computer readable medium. The tangible computer readable medium may be for example a flash memory, a read-only memory (ROM), a random access memory (RAM), any other computer readable storage medium and any storage media. Although the method of diagnosing an ultrasound probe having a probe head comprising a plurality of transducer elements in accordance with another embodiment are explained with reference to the flow chart of FIGS. 10, 11 and 12, other methods of implementing the method can be employed. For example, the order of execution of each method steps may be changed, and/or some of the method steps described may be changed, eliminated, divide or combined. Further the method steps may be sequentially or simultaneously executed for diagnosing an ultrasound probe having a probe head comprising a plurality of transducer elements in accordance with another embodiment.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An ultrasound probe diagnosing apparatus for diagnosing an ultrasound probe including a probe head with plurality of transducer elements, the apparatus comprising:
   a probe casing configured to be positioned to cover the probe head when attached to the ultrasound probe via a plurality of locking members, the probe casing including a reflective interface configured to reflect ultrasonic signals transmitted from one or more of the plurality of transducer elements, where the casing and the reflective interface are shaped so each of the plurality of transducer elements is equidistant from the reflective interface when the probe casing is attached to the ultrasound probe; and
   a processor configured to:
      transmit a pulse signal to one of the plurality of transducer elements, causing the one of the plurality of transducer elements to generate an ultrasonic signal;
      analyze a performance of the one of the plurality of transducer elements based on a reflection of the ultrasonic signal from the reflective interface;
      compare the reflection of the ultrasonic signal to a predefined threshold;
      determine a performance degradation level associated with the one of the plurality of transducer elements based on the comparison of the reflection of the ultrasonic signal to the predefined threshold; and
      predict a performance degradation trend associated with the one of the plurality of transducer elements.

2. The ultrasonic probe diagnosing apparatus of claim 1, wherein the probe casing comprises an acoustic layer above the reflective interface.

3. The ultrasonic probe diagnosing apparatus of claim 1, wherein the reflective interface is composed of a metal.

4. The ultrasonic probe diagnosing apparatus of claim 1, where both the probe head and the probe casing have a convex shape.

5. The ultrasonic probe diagnosing apparatus of claim 1, wherein the processor is further configured to present the performance degradation trend as a performance degradation curve.

6. A method of analyzing performance of an ultrasound probe having a probe head comprising a plurality of transducer elements, wherein the method comprises:
   placing a probe casing over the probe head, the probe casing including a reflective interface adapted to reflect ultrasound, where the probe casing is positioned so that each of the plurality of transducer elements is equidistant from the reflective interface;
   transmitting ultrasonic signals by a transducer element of the plurality of transducer elements;
   reflecting the ultrasonic signals by the reflective interface positioned proximal to the probe head;
   receiving reflected ultrasonic signals by at least a subset of the transducer elements in the probe head;
   determining, with a processor, a performance degradation level of the transducer element based on a comparison of the reflected ultrasonic signal with a predefined threshold;
   predicting, with the processor, a performance degradation trend associated with the transducer element; and
   presenting the performance degradation trend as a performance degradation curve.

7. The method of claim 6, further comprising identifying, with the processor, that a performance of the transducer element has reached a warning level.

8. The method of claim 6, further comprising categorizing, with the processor, the transducer element into one of a plurality of different degradation levels.

* * * * *